United States Patent
Hamilton et al.

(10) Patent No.: US 10,878,382 B2
(45) Date of Patent: Dec. 29, 2020

(54) SYSTEM AND METHOD OF SCHEDULING WORK WITHIN A WORKFLOW WITH DEFINED PROCESS GOALS

(71) Applicant: Verint Americas Inc., Alpharetta, GA (US)

(72) Inventors: Edward Hamilton, Mount Hamilton, CA (US); Kaushik Deka, New York, NY (US)

(73) Assignee: Verint Americas Inc., Alpharetta, GA (US)

( * ) Notice: Subject to any disclaimer, the term of this patent is extended or adjusted under 35 U.S.C. 154(b) by 264 days.

(21) Appl. No.: 16/024,134

(22) Filed: Jun. 29, 2018

(65) Prior Publication Data

US 2018/0308068 A1    Oct. 25, 2018

Related U.S. Application Data

(63) Continuation of application No. 13/951,011, filed on Jul. 25, 2013, now Pat. No. 10,032,136.

(60) Provisional application No. 61/677,126, filed on Jul. 30, 2012.

(51) Int. Cl.
  *G06Q 10/10* (2012.01)
  *G06Q 10/04* (2012.01)
  *G06Q 10/06* (2012.01)

(52) U.S. Cl.
  CPC ......... *G06Q 10/1097* (2013.01); *G06Q 10/04* (2013.01); *G06Q 10/06311* (2013.01)

(58) Field of Classification Search
  None
  See application file for complete search history.

(56) References Cited

U.S. PATENT DOCUMENTS

| | | | |
|---|---|---|---|
| 6,463,346 B1 | 10/2002 | Flockhart et al. | |
| 6,707,903 B2 | 3/2004 | Burok et al. | |
| 6,952,732 B2 | 10/2005 | Nourbakhsh et al. | |
| 7,672,746 B1 | 3/2010 | Hamilton et al. | |
| 7,788,286 B2 | 8/2010 | Nourbakhsh et al. | |
| 7,853,006 B1 | 12/2010 | Fama et al. | |
| 7,864,946 B1 | 1/2011 | Fama et al. | |
| 7,904,481 B1* | 3/2011 | Deka | G06Q 10/06 707/799 |
| 8,015,042 B2 | 9/2011 | Seetharaman et al. | |
| 8,224,472 B1 | 7/2012 | Maluf et al. | |
| 8,463,638 B2 | 6/2013 | Hamilton et al. | |
| 2002/0143597 A1* | 10/2002 | Andre | G06Q 10/06375 705/7.14 |
| 2004/0019891 A1* | 1/2004 | Koenen | G06F 9/5044 718/102 |
| 2007/0143169 A1 | 6/2007 | Grant | |
| 2007/0276689 A1* | 11/2007 | Slone | G06F 8/38 717/109 |

(Continued)

*Primary Examiner* — Sujay Koneru
(74) *Attorney, Agent, or Firm* — Christopher M. Scherer; DeWitt LLP

(57) ABSTRACT

A system and method schedule work within a workflow with defined process goals. A plurality of work queues are defined that comprise work items. The plurality of work queues are associated with one or more links between a parent work queue and at least one child work queue to form at least one work process. At least one work process goal is defined for each work process. A work schedule to achieve the work process goals is generated.

9 Claims, 8 Drawing Sheets

(56) References Cited

U.S. PATENT DOCUMENTS

| | | | |
|---|---|---|---|
| 2008/0004936 A1* | 1/2008 | Fama | G06Q 10/063114 |
| | | | 705/7.21 |
| 2008/0162242 A1 | 7/2008 | Schneur | |
| 2008/0300955 A1 | 12/2008 | Hamilton | |
| 2009/0112673 A1 | 4/2009 | McCrady | |
| 2010/0257530 A1* | 10/2010 | Brenneman | G06F 9/4881 |
| | | | 718/102 |
| 2011/0072436 A1 | 3/2011 | Gilat | |
| 2011/0077994 A1 | 3/2011 | Segev | |
| 2011/0235509 A1* | 9/2011 | Szymanski | H04L 47/56 |
| | | | 370/230 |
| 2019/0188034 A1* | 6/2019 | Lloyd | G06F 9/5027 |

* cited by examiner

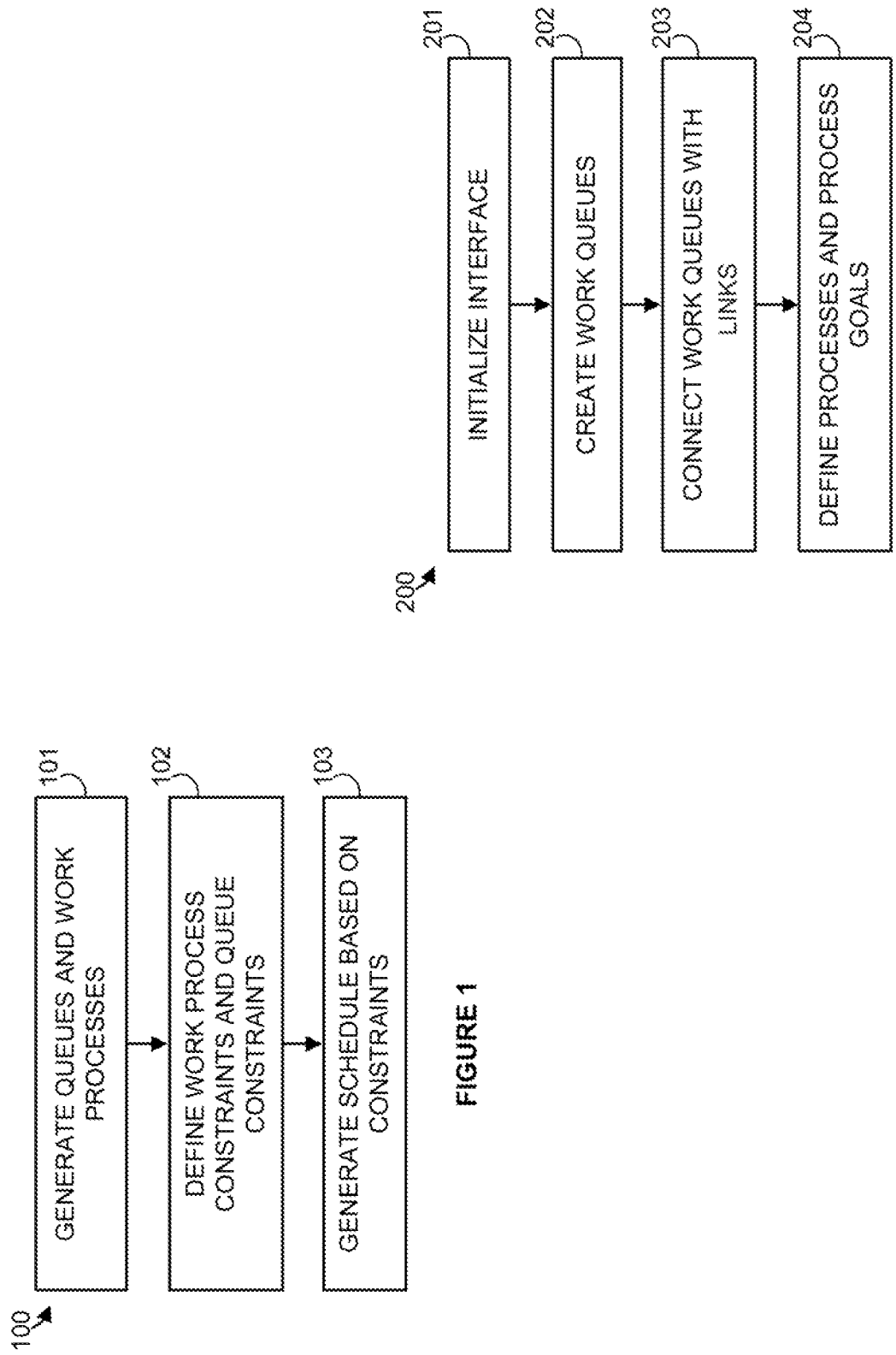

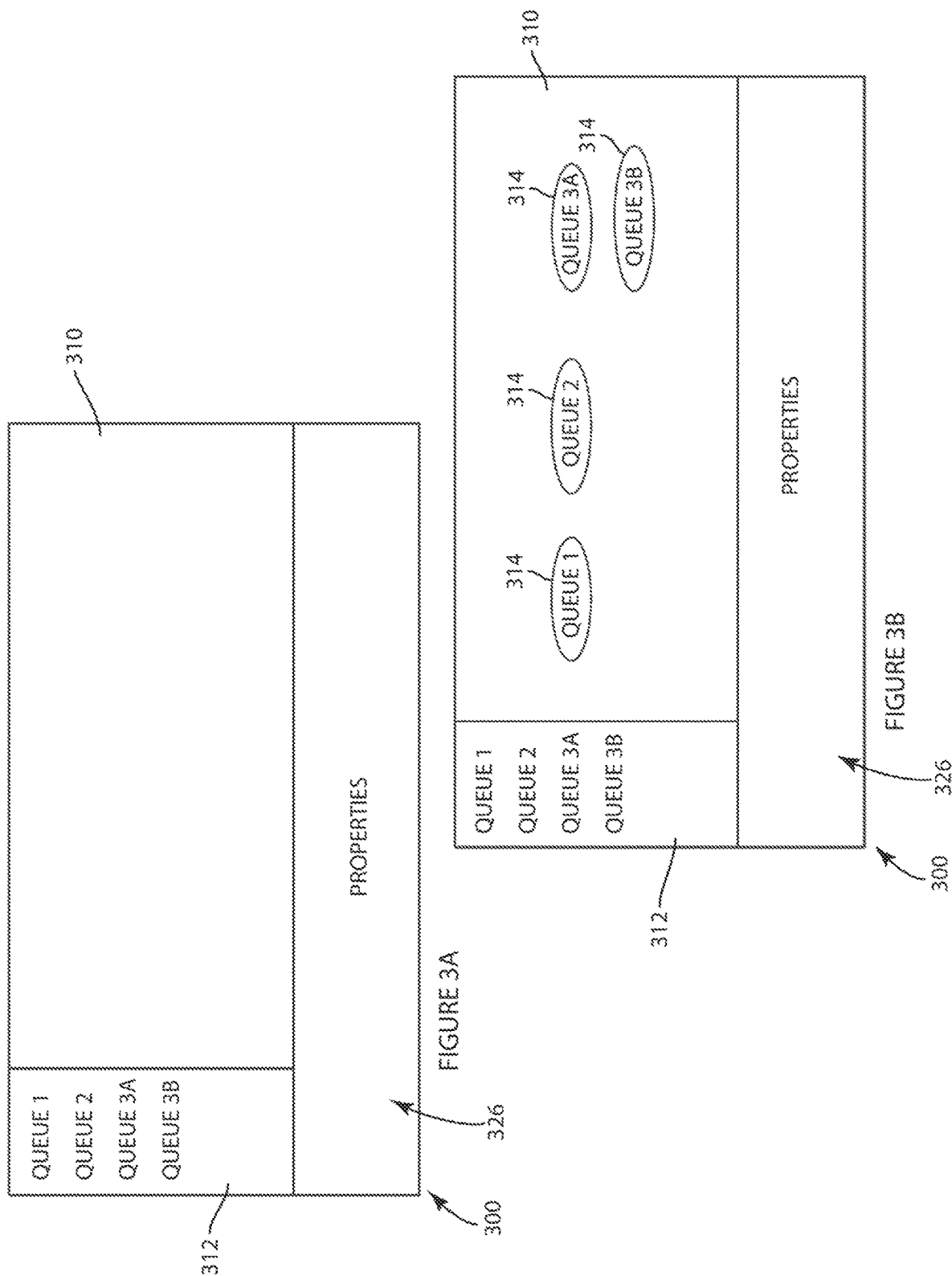

SYSTEM AND METHOD OF SCHEDULING WORK WITHIN A WORKFLOW WITH DEFINED PROCESS GOALS

CROSS-REFERENCE TO RELATED APPLICATION

The present application is a continuation of U.S. application Ser. No. 13/951,011, filed Jul. 25, 2013, which Application claims priority of U.S. Provisional Patent Application No. 61/677,126, filed Jul. 30, 2012, the contents of which are incorporated herein by reference in their entireties.

BACKGROUND

A workflow comprises a sequence of connected steps called work queues. A work queue is a method of tracking the individual steps of the workflow, such that the work queues are smaller divisions of the overall workflow. Furthermore, a workflow can be divided into intermediate divisions called work processes. Work processes comprise two or more linked work queues.

From these defined workflows, work queues, and work processes, models can be created and schedules for employees can be defined. These schedules could take into account a variety of constraints defined for each portion of the workflow including the amount of time to complete a queue or process, the amount of workers available, the amount of hours available for each worker, and the like.

BRIEF DISCLOSURE

A method of scheduling work assignments for a plurality of employees includes defining a plurality of work queues that include work items. The plurality of work queues are associated with one or more links between a parent work queue and at least one child work queue to form at least one work process. At least one work process goal is defined for each work process. A work schedule is generated to achieve the work process goals.

A method of work force management and includes defining a plurality of work queues that include work items. The plurality of work queues are associated with one or more links between a parent work queue and at least one child work queue to form at least one work process. At least one work process goal is defined for each work process. A schedule of employee work queue assignments is generated to achieve the work process goals. The performance of the generated schedule is simulated. At least one performance metric is calculated from the simulation. The at least one performance metric is compared to an acceptance criteria. If the at least one performance metric meets the accepted criteria, the schedule of employee work queue assignments is accepted and if the at least one performance metric does not meet the acceptance criteria, a new schedule employee work queue assignments is generated.

A method of scheduling work assignments for a plurality of employees includes defining a plurality of work queues, each work queue being representative of a task to which one or more employee of a plurality of employees can be assigned. A graphical user interface is presented on a graphical display. A selection of one or more work queues of the plurality of work queues is received. A graphical indication of each of the selected work queues is presented on the graphical user interface. A plurality of links are created, each link existing between two work queues. At least one constraint associated with at least one work queues or link is defined. A selection of at least two work queues is received and the selected at least two work queues are defined as a work process. At least one work process goal is defined. A schedule of assignments of tasks associated with work queues to be performed by the plurality of employees is generated. The generated work schedule is defined by the at least one constraint and the at least one work process goal.

BRIEF DESCRIPTION OF THE DRAWINGS

FIG. 1 is a flowchart that depicts an exemplary embodiment of a method for scheduling work processes.

FIG. 2 is a flow chart that depicts an exemplary embodiment of a method of inputting work queues and work processes.

FIGS. 3A-3D illustrates exemplary screenshots for inputting work queues and work processes.

DETAILED DISCLOSURE

Systems, methods, and software are disclosed herein to improve workforce management. The method includes an interface wherein work queues can be created and combined to create work processes. From these work processes, and work process goals, the method simulates the work processes and creates an optimized schedule to complete the work processes.

Figure 6:
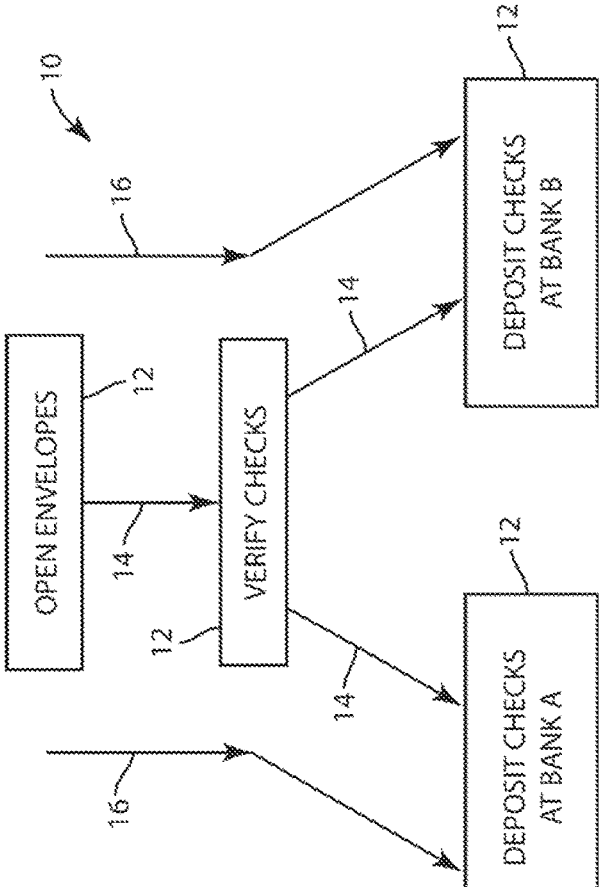
FIG. 6 depicts an exemplary embodiment of a workflow.

FIG. 6 depicts an exemplary embodiment of a workflow 10, which is used herein for merely exemplary purposes. While the workflow 10 is a relatively simple workflow 10 directed to achieving a goal in an exemplary banking function of obtaining and depositing checks. The workflow 10 is made up of a plurality of work queues 12. Each of the work queues represents a task that must be performed in carrying out the workflow 10. Each work queue 12 represents a queue of work items that are available for processing according to the task of the work queue 12.

The workflow 10 includes the work queues 12 of opening envelopes, verifying checks, depositing checks at bank A and depositing checks at bank B. In a non-limiting example, the open envelopes work queue 12 translates into the real world as a stack of unopened envelopes. Each unopened envelope is a work item that must be processed (open the envelope) in order to fulfill the task of the work queue 12 and move the resulting work item (the check contained within the envelope) to the next work queue 12.

In the workflow 10, work queues may be connected by links 14. The links 14 between the work queues 12 represent the transition of a work item from a completed work queue to populate the next work queue 12 in the workflow 10. As noted above, two or more work queues 12 connected by a link 14 may be further connected and defined as a work process 16. Work processes 16 can represent sub-processes within the workflow 10. Multiple work processes 16 may overlap or partially overlap with one another. For example, one work process exists resulting in the deposit of checks at bank A while another work process 16 exists resulting in the deposit of checks at bank B. Both of these work processes 16 include the work queues of open envelopes and verify checks. The difference between the work processes only occurs when the verified checks are to be deposited at two different banks.

FIG. 1 is a flowchart illustrating a method 100 for operating a workforce management system. As shown in FIG. 1, the method begins at step 101 by inputting work queues and work processes using an interface. In one example, the interface could be a user graphical interface as further exemplarily depicted in FIGS. 3A-3D and described with respect to FIG. 2. However, other interfaces could include a command line interface, a touch interface, or the like.

Next, at step 102, constraints are placed on the work queues and work processes defined in step 101. These constraints could include an overarching time period goal for the work processes to be completed, the amount of time a single work process or work queue takes to be completed, the amount of time a similar work process or work queue takes to be completed, the workers available, workflow percentages regarding the flow of work from one queue to another queue, or any other data that would be beneficial to determining an optimized schedule. Exemplary embodiments of such constraints will be disclosed in greater detail herein.

Furthermore, the constraints of step 102 could include of both express constraints and hidden constraints. The express constraints are input prior to any schedule optimization, and are not subject to change during the optimization process. However, unlike express constraints, hidden constraints can be added or modified at any point of the process. Thus, these constraints could be used to modify work queue or work process time periods to create a more optimized schedule.

In one example, the express constraints of step 102 could be entered manually using the interface of step 101 or a different interface. For example, a six-hour overarching work process goal could be defined for the work processes or a single work process could be defined as requiring four hours to complete. Additionally, constraints could be entered regarding other work processes including the amount of time to complete a similar work process and the amount of workers to complete the similar work process. Furthermore, these constraints could be saved to a storage device, such as a hard disk, to be used for future constraints on scheduling.

In another example, the express constraints of step 102 could be entered by an automated system. For example, a timer could be set to input the time to complete a work queue or a work process. This information could also be saved to a storage device, such as a hard disk, to be used for future constraints on scheduling.

After placing constraints on the work queues and work processes at step 102, the method then creates an optimized schedule based on these constraints at step 103. Here, the method uses the constraints of step 102 and applies an optimization algorithm to determine an optimized schedule.

In one example, the optimization method could include a "Hill-Climbing" method. In an embodiment, the "Hill-Climbing" optimization method entails creating an initial work schedule including dates, times, and jobs for each employee to work. Next, the simulation will attempt to create a more optimized work schedule by scoring and comparing a new work schedule with the initial work schedule. The schedule with the better score will remain and the other schedule will be eliminated. Thereafter, the comparison and simulation of schedules can be done for one or more iterations to find an optimized schedule.

In one example, hidden constraints could be added or modified during the optimization process. These hidden constraints could include time constraint modifications for work processes or work queues. Furthermore, the hidden constraints could then be used in the creation of future schedules to be compared or, alternatively, used in scoring the comparisons between schedules.

FIG. 2 is a flowchart illustrating a method 200 for modeling work processes using queues. The method 200 of FIG. 2 may be carried out using a work queue flow editor as disclosed in greater detail herein to graphically link work queues and create a workflow model and define one or more work processes within the workflow. The method begins at step 201 by initializing a graphical interface. Non-limiting embodiments of the graphical interface are depicted at FIGS. 3A-3D. Next, at step 202, the user creates different work queues that are part of the workflow. For example, the process described above and depicted at FIG. 6 includes opening the envelopes that contain checks, verifying the checks, and depositing the checks as one example of a series of work queues in the banking industry. Thereafter, at step 203, the user can then connect work queues using links to create a workflow. These links are created directionally such that one queue goes into another queue. In other words, using the example above, opening envelopes that contain checks could have a link directed at verifying checks, and verifying checks could have a link that is directed at depositing checks. The connection of all of the work queues creates a workflow. Additionally, work queues can also be directed to one or more subsequent work queues. For example, if checks are deposited two different banks after opening, links are drawn to both banks representing the workflow to each.

Furthermore, the user interface can be used at step 204 for defining processes and process goals. For example, the user can select two or more elements of the workflow and create a work process. In the graphical user interface, each work process can be identified by a color and/or a title. A work process is a collection of linked queues that define a workflow or constitute a portion of the workflow. Additionally, a single work queue can belong to multiple work processes.

In one example, when a work queue belongs to multiple work processes, each color identifying the groups is represented proportionately in the queue.

In one example, a user can create two work processes for two independent workflows. From these two work processes, an overarching work process goal could be defined. Such a process goal could be used to define a set period of time for all processes to be completed and, thus, could be used as a constraint for step 102.

Non-limiting embodiments of screen shots of the above user interface can be found in FIG. 3 and are described in further detail herein.

Figure 3C:
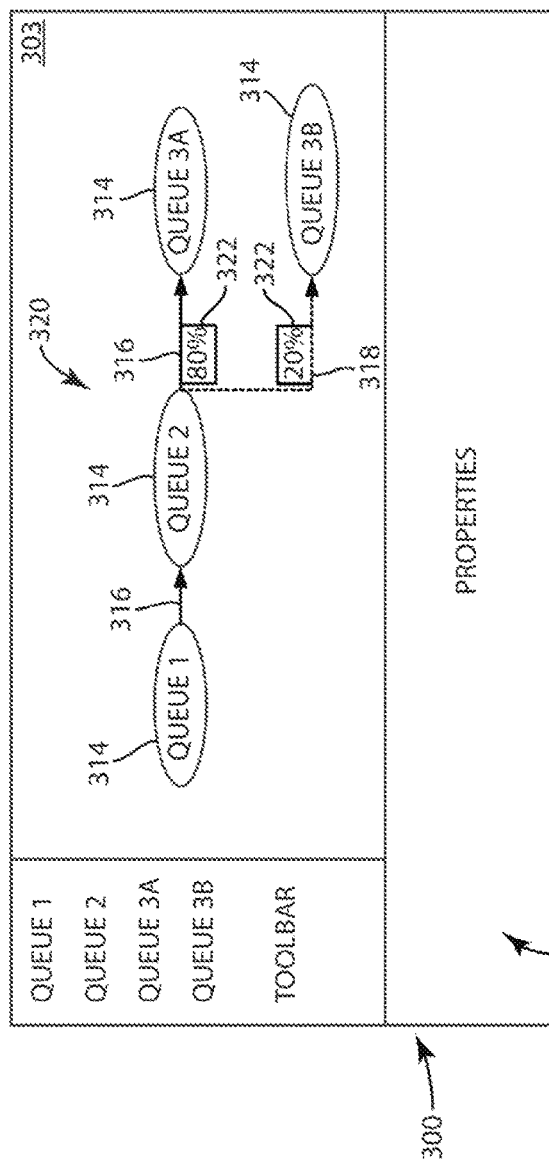
Figure 3D:
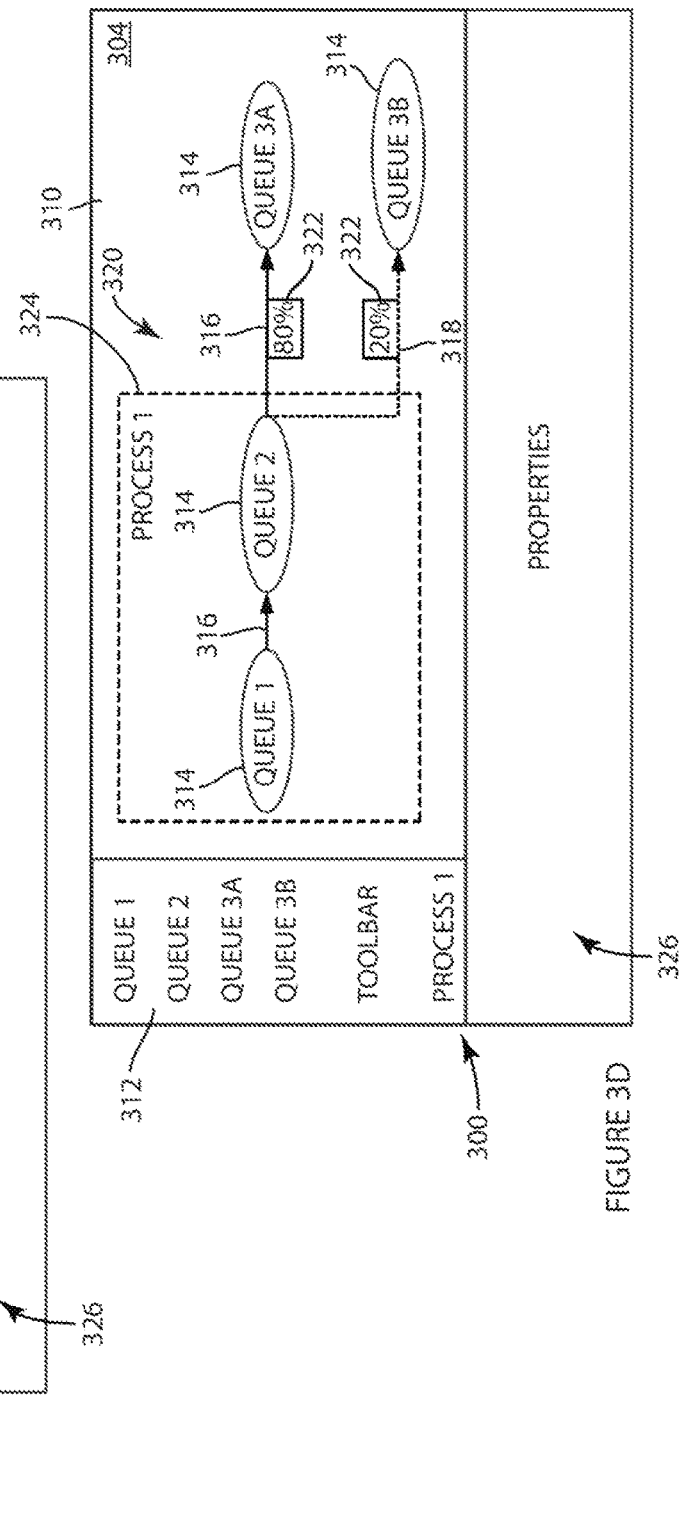

FIGS. 3A-3D depict exemplary screenshots for the graphical user interface (GUI) 300 of the method 200 described above with respect to FIG. 2. The method 200 begins at step 201 by initializing the user interface exemplarily to present the GUI 300 as depicted in FIG. 3A. At FIG. 3A, the user is presented with a blank canvas 310 and a toolbar 312 to modify the blank canvas 310. Toolbar 312 includes a listing of potential available work queues that may be incorporated into a new workflow. The blank canvas 310 can be edited by the user to add work queues 314 to the canvas (step 202) that represent pieces of the workflow as depicted at FIG. 3B. The placed work queues 314 are exemplarily identified as queue 1, queue 2, queue 3A, and queue 3B. The work queues 312 can exemplarily be placed on the canvas 310 by dragging and dropping the work queue identifications from the toolbar 312 to the canvas 310. Next, in accordance with step 203 described above, and depicted at FIG. 3C, the user can connect the work queues 314 using links 316. These links 316 may be created directionally such that a completed work queue 314 flows into a subsequent work queue 314. In other words, once completed, work from work queue 1 could flow into work queue 2, and work from work queue 2 could flow into work queue 3A. Additionally, the output of work queues 314 can also be directed to one or more subsequent work queues 314. For example, completed work from work queue 2 could flow along link 316 to work queue 3A and along link 318 to work queue 3B. Once all of the work queues 313 have connected by links 316, 318, a workflow 320 has been created.

As depicted in FIG. 3C, in embodiments wherein multiple links (e.g. 316, 318) extend from one work queue 314 to multiple subsequent work queues 314, a percentage 322 can be added to link 316 or 318 to denote the apportionment of the workflow volume through that link in the workflow. In embodiments, these percentages can be adjusted by the user in constructing the workflow. These percentages can be used as constrains as described in further detail herein and in predicting the percent of workflow apportioned between descendant work queues, in embodiments wherein further work queues exists after the alternative work queues 3A and 3B.

After establishing the entire workflow 320, the user can then associate different queues to create a work process 324 defined within the workflow 320. For example, the user could select work queue 1 and work queue 2 and designate them to be Process 1, as seen in the screenshot depicted in FIG. 3D. The user could then select an alternative combination of work queues 314 from the workflow 320 and create other work processes 324. Moreover, with the selection of work queues 314 to create work processes 324, the user can define an overarching work process goal to constrain the scheduling as disclosed in further detail herein. In one such embodiment, the user may select work queue 314 and enter one or more work process goals in a properties tab 326 within the GUI 300. In a merely exemplary and non-limiting embodiment, such a work process goal may exemplarily be "complete all work in work queue 1 prior to 3 pm through Process 1" or "complete Process 1 by 5 pm." It will be recognized that in embodiments, a similar procedure can be used to create goals or edit properties of the work queues 314 or links 316, 318. In at least one example, the goal could set the amount of hours, days, months, or years to complete a work process. In turn, the optimization method will use these constraints to develop an optimized schedule.

In embodiments as disclosed herein, the work process 322 is a collection of linked work queues 314 that define at least a portion of a workflow 320. In embodiments of the GUI 300, each created work process 322 may be indicated with a unique color. Those work queues or links that do not belong to one or more work processes may be color coded to reflect this status as well. In an embodiment, an indication of the newly created process 322, "Process 1" appears as an indication in the toolbar 312 that also lists each of the work queues in the workflow 320. In an embodiment, a single work queue may belong to multiple work processes. When a work queue belongs to multiple work processes, each of the process color indication may be represented in the work queue icon 314 to reflect this designation.

Figure 7:
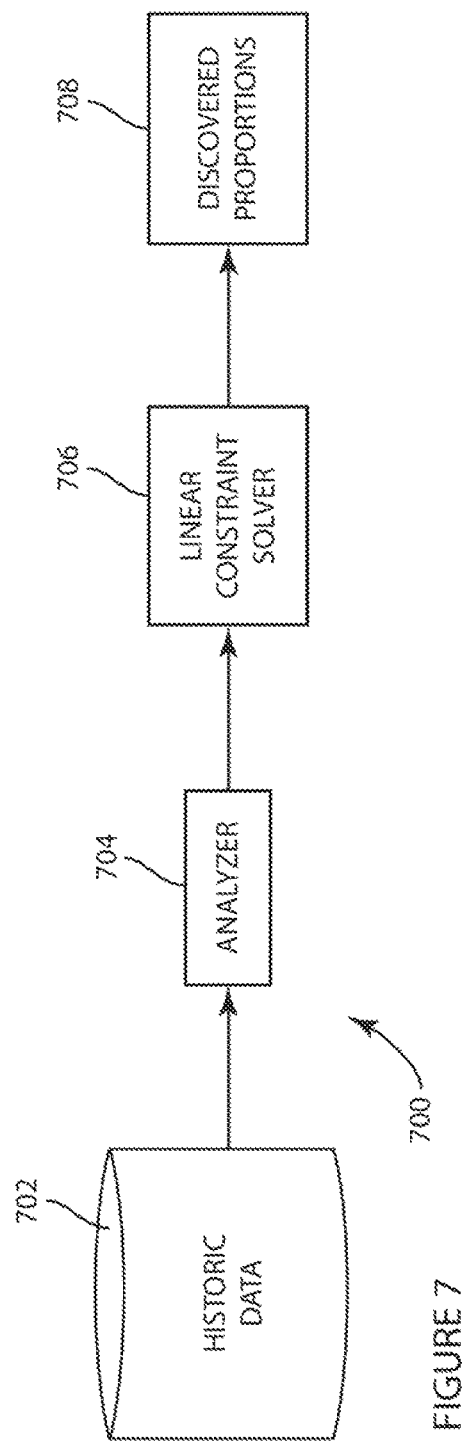
FIG. 7 is a flow chart that depicts on exemplary embodiment of a method of proportion discovery.

As described above, embodiments of the workflow 320 may include the definition of one or more percentages which may be used as constraints, and predict the percentage proportions in which work items processed from a work queue 314 are distributed across multiple alternative subsequent work queues 314. As noted above, the percentages may be established by user input. In an alternative embodiment, the percentages may be calculated in accordance with embodiments of a method as disclosed herein with respect to FIG. 7. In embodiments, the completion of a work item in one work queue (which may be referred to as the performance of a step in a work process) drives a new work item in a subsequent work queue some or all of the time. When the workflow relationships are simple and easily defined, a user input of a static percentage may be used. However, when more complex relationships between two or more work queues and a process must be molded, a more robust method of determining the percentages is required.

As used herein, the average relationship of arrivals to arrivals consider the ratio of arrivals among one or more source work queues and one or more subsequent work queues. In an alternative embodiment an average relationship of completion to arrivals considers the ratio of completions of work items in one work queue to the arrivals at a subsequent work queue from that work queue.

In a complex linking scenario, one or more work queues may be "cross pollinated" by receiving work item arrivals from multiple work queues and the outputs of the work queue may be distributed among multiple subsequent work queues as well. In such embodiments, the proportion calculations as identified above may involve complex constraint logic. For this reason, a linear constraint solver maybe used to solve for the representative proportions. An embodiment of a method of proportion discovery 700 analyzes historical work volume arrivals and check-ins, produces a minimization function, a set of constraints, and a set of variables (e.g. the percentage proportions to be discovered), and passes them into a linear constraints solver in order to discover the proportions at 708.

The analyzer 704 receives the historical data 702 and identifies the volume for a specified day on an identified work queue. The analyzer 704 also identifies the proportion to be discovered between an identified work queue and a subsequent work queue. The analyzer 704 also identifies the function to be minimized by the linear constraint solver 706. The linear constraint solver 706 operates to provide a least squares (best fit) approximation of the linked work queue proportions giving the historical data. In an embodiment, the least squares approximation is determined by squaring the summation of the daily volume for all work queues times the proportion to be discovered between the work queue and its subsequent work queue minus the daily volume for the subsequent work queues.

Thus by analyzing the historical relationships between work queues and subsequent work queues, proportions can be discovered between work queues and complex workflow.

Figure 4A:
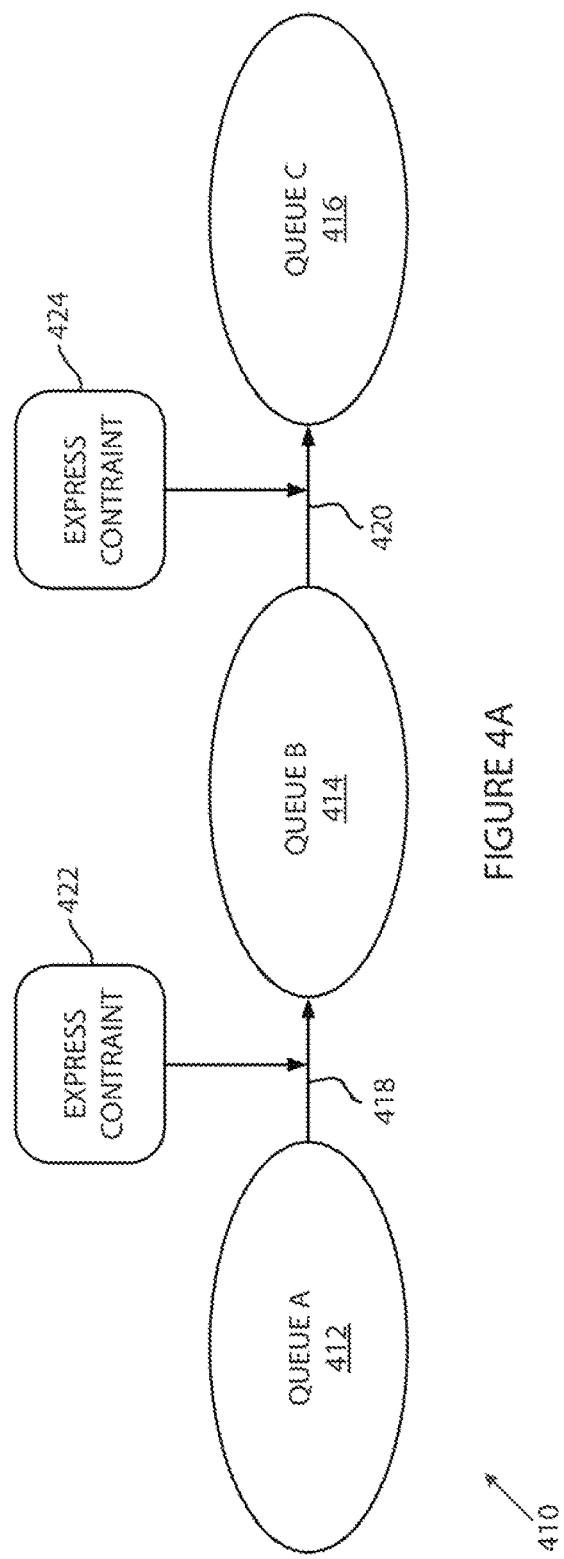
FIGS. 4A and 4B are flow chars that depict exemplary embodiments of methods of creating and modifying hidden constraints.
Figure 4B:
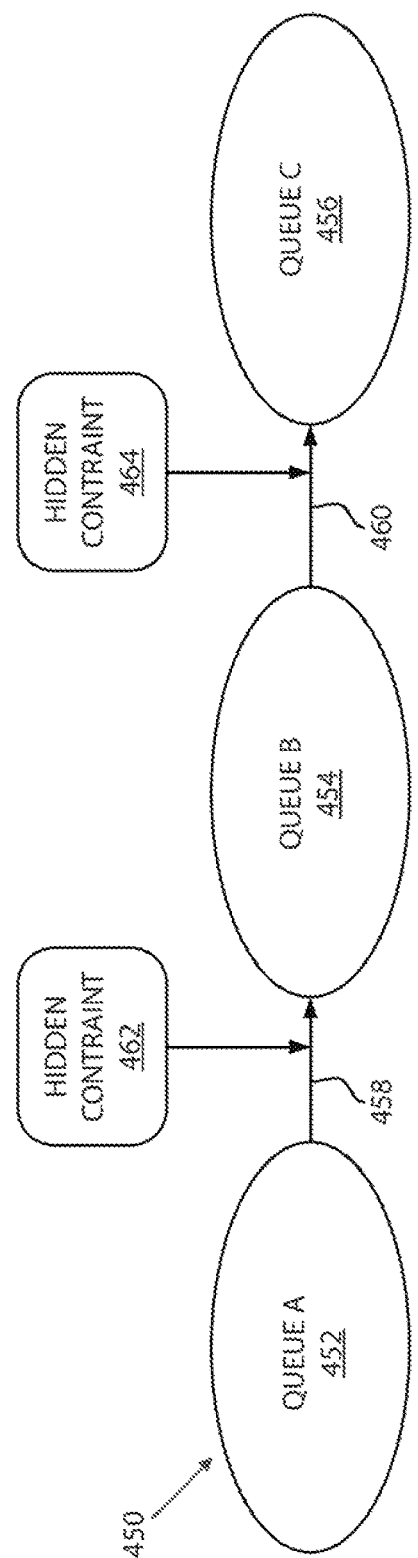

FIGS. 4A and 4B illustrate the implantation of constraints and the introduction and modification of hidden constraints as referenced above with respect to FIG. 1. The constraints as used in embodiments of creating an optimized schedule as disclosed herein include both express constraints and hidden constraints. Express constraints are input prior to any schedule optimization, and are not subject to change during the optimization process. However, unlike express constraints, hidden constraints can be added or modified at any point of the schedule optimization process.

As shown in FIG. 4A, a work process 410 may include three work queues, queue A 412, queue B 414, and queue C 416, respectively connected by links 418 and 420. At each of the work queues 412, 414, 416 and links 418, 420 an express constraint 422, 424 may be determined regarding the amount of time to complete the queue or link. These express constraints 422, 424 may be established as a property exemplarily of a work queue, or link. Such an express constraint may exemplarily be an average handling time to process each work item in a work queue, or alternatively a lag time associated with each link before a work item is taken up by a next work queue. Therefore, all of the work queues 412, 414, 416 and links 418, 420 could have a set amount of time to be completed, and in an exemplary embodiment the summation of these set amounts of time would results in a total time (T) for the work process to be completed.

In situations where the scheduling of multiple work processes is needed to fulfill an overarching work process goal, it may be impossible to create a schedule that satisfies each work process' express constraints. In other words, each work process may not be able to be completed in their respective total time (T). For example, if employee X is the only employee that can perform the tasks associated with work queue A and work queue B, then it will be impossible for employee X to simultaneously work on work queue A and work queue B. Thus, a completely optimized schedule may become unobtainable. In an alternative example, the work process 410 may have a work process goal of time (T) as described above, but this does not account for backlogs at links 416, 418 or backlogs at one or more of the work queues 412, 414, 416.

Therefore, as disclosed herein, hidden constraints are used between the work queues to modify the work process times. As can be seen in image FIG. 4B, hidden constraints 462, 464 are added exemplarily to links 458, 460. It will be understood that hidden constraints may also be added to work queues 452, 454, 456 in work process 450. The hidden constraints 462, 464 serve to extend the work process from a total time T to a total time T+hidden constraints. These constraints could then allow the completion of the optimization method as described in FIG. 1, without the optimization becoming unobtainable as described above.

In one example, the hidden constraints are added and modified between iterations of the optimization process described in FIG. 1. In another example, the hidden constraints could be used in creating the schedules for the optimization process as described in FIG. 1. This modification to the generation of schedules could prevent resource constraints, bottlenecks, and other similar issues by changing the time periods to complete a work process. In other words, this constraint modification could schedule a process for two days instead of one day, if there were improvements within other areas of the schedule to complete an overarching goal for the processes.

In another example, the hidden constraints could be used in the scoring process of the optimization method. In other words, rather than defining schedules using the hidden constraints, the hidden constraints could be used in comparing different schedules. This method would be beneficial in optimization processes where the generated schedules were not required to follow the express constraints, but were rather scored better based on their proximity to the express constraints. In this situation, the hidden constraints could be used to promote schedules that help further the overall goal, but violate some of the express constraints for the individual work processes.

Referring back to FIG. 1, after the work process constraints, queue constraints, and work process goals are defined, then a schedule can be generated based upon these constraints to simulate the workflow, evaluate the simulated workflow in order to create an optimized work schedule for the workflow. In an embodiment, a modified push-forward simulation is used to simulate work schedules for evaluation and optimization. In the push-forward simulation, the simulation moves all work queues forward in parallel interval by interval so that an interval is not "passed" before all of the volume has been generated on that interval. In an embodiment, it is to be noted that although the incoming volume is handled in parallel, the interval variables of the next available resource may move forward in time at different rates. Such embodiments represent that individual work queues may process individual work items and therefore exhaust the work queue at different rates.

Next, the queue volume of linked work queues is automatically updated as agent work time is allocated. This updating of work volume may be dependent upon the link type or other constraints placed upon a link between work queues. In an embodiment, a link may be defined as a "generate volume on arrival" link, while other links may be identified as "generate volume on check-in" links. If a link is a "generate volume on arrival" link, then volume is generated on linked queues (within the workflow) as soon as volume is generated on the parent work queue. The implication of this is that if a workflow comprises only "generate volume on arrival" type links, then all volume in the workflow is generated at the start of the push-forward simulation. Alternatively if a workflow includes "generate volume on check-in" links, when agent work time is allocated to handle the volume on one work queue, volume will automatically be generated on all subsequent linked queues (within the workflow) until another "generate volume on check-in" link is reached. Therefore, the "generate volume on check-in" links require the additional input of allocated agent work time before work volume is generated on child work queues.

In some embodiments, heuristics are applied in order to avoid locally optimal states that do not lead to a globally optimal solution within the simulations. Since dynamically generating volume generates unmet demand on the linked work queues the unmet demand on the linked work queues is scored before the work volume was generated. Without a score of the unmet demand on linked work queues, adding an agent activity to handle volume on a parent queue could look "locally" bad to the search engine, as this allocation of agent activity would create bottle necked unmet demand on subsequent child queues, while the pre-allocated agent activity can satisfy the demand on the parent queue. In another embodiment, during initialization of the simulation for each work queue in a workflow, the total generated volume for the child work queue is computed. The computation of the total generated volume for child queues additionally help to solve the problem as identified above where scheduling agent activity on a single process step (e.g. parent queue) looks "locally" bad due to the dynamically generated unmet demand on subsequent child queues, while the additional agent assignment to the work queue may yield better overall service times.

In an embodiment, the concern is addressed by introducing a penalty for unhandled work load (UWpen) and a measure of total proportion of children (TCP) where c is a linked child queue of type generate volume on chick-in for a parent queue q, c is the proportion parameter for this linked child queue. Thus the service level score (SL) used to evaluate a push-forward simulation:

$$SL:=\text{Sum[all } q]([\text{Sum[all } i](PCApen(i,q))*\text{Priority} \\ (PCApen))+\text{Sum[all } i](AQWpen(iq))*\text{Priority} \\ (AQWpen))+(UWpen(q)*TPC(q,1)*\text{Priority} \\ (UWpen))]*\text{Priority}(q))$$

In an embodiment, another penalty score is incorporated into the simulation representative of a percent of work not handled in the predetermined service time goal. In an embodiment as disclosed herein, the simulation calculates the PCA penalty by first calculating the estimated time (ET) to finish an item of work belonging to a work process (P) which arrived at step (Q) at interval (I) and whose step (Q) is being handled at interval (J). The estimated time (ET) is provided by the following equation:

$$ET(i,q,p,j):=AHT(j,q)+\text{Max[all } c(q)](ET(i,c,p,j+AHT \\ (j,q)+LAGC+EQW(j+AHT(j,q)+LAGC,c)))$$

In the above equation, AHT is the average handle time which is the time it takes for the average agent to handle the work on a specified work queue at a specified interval. LAG is the time interval between when a work item is completed from a parent work queue to when the work item will be taken off at a child work queue. EQW is a learned factor which is a dynamically estimated additional wait factor that represents a delay in processing in addition to the handling time and lag before the work item at the child queue can be handled. The wait represented by the EQW factor may exemplarily be due to resource constraint or bottlenecks with in the work schedule. As will be described herein, the ET and EQW, in addition to the simulated annealing search, which will be described in more detail herein, provides a prediction of whether scheduling an agent activity on some work queue in the work process will lead to the work process being resolved within the service time goal.

In an embodiment, a penalty representative of the percentage of work not handled within the service time goal (PCApen) is calculated and used in the calculation of the total service level score (SL) as described above. In the modified PCApen, the PCA penalty is modified in order to account for the previous step in the process by subtracting the previous step in the process from the calculation of PCApen, double counting of work items is prevented. Logically, the last step in the workflow handle will provide the best estimate as to whether the complete process will be handled within the service time. This is reflected in that the EQW term falls away as the workflow progresses towards the final step in the workflow. The uncertainty associated with the EQW term then similarly falls away with the calculation of the PCA penalty. In an embodiment, the PCA penalty can be calculated with the following equation:

$$PCAppen(i,q,p):=\max[\text{Sum[all } j\_\_:ST(i,q,p,j)>SGp] \\ (WH(i,q,j)),(1-SG\%(i,p))*W(i,q)]-PCAppen(i-1,q-1,p)$$

In still further embodiments, the simulation is designed to avoid being stuck at "locally" optimal solutions that are not globally optimal solutions. Another cause of this is a penalty associated with average queue wait times which results in the search engine scheduling agent activities as early as possible if all else is equal. In order to capture the fact that some work queue steps could be handled later than other work queue steps without hurting the overall service level, an earliness penalty (Epen) was developed. It is to be noted that in embodiments, the earliness penalty is turned off for the final evaluations, but is on for most of the simulation. In an embodiment, the earliness penalty may be defined as:

$$Epen(i,q,p):=\text{Sum[all } j\_\_:ST(i,q,p,j)<SGt(p)](WH \\ (i,q,j)*(SGt(p)-ST(i,q,p,j))$$

In the above equation, the earliness penalty is for an item of work that belongs to process P, arriving at step Q at internal I, and whose step Q is being handled at interval J. After calculating the earliness penalty, a service level score (SL) may be calculated by the following equation:

$$SL:=\text{Sum[all } q][[(UWpen(q)*TPC(q,1)*\text{Priority} \\ (UWpen))+(\text{Sum[all } i](PCApen(i,q))*\text{Priority} \\ (PCApen))+(\text{Sum[all } i](Epen(i,q))*\text{Priority} \\ (Epen))+(\text{Sum[all } i](AQWpen(i,q))*\text{Priority} \\ (AQWpen))]*\text{Priority}(q)]+\text{Sum[all } q]( \\ URpen(q))*\text{Priority}(URpen))$$

In the above equation priority (UWpen) is greater than priority (PCApen) is greater than priority (Epen) is greater than priority (AQWpen) is greater than priority (URpen). In the above service level scoring function, the term UWpen ensures (above all else), work gets handled as the UWpen represents a penalty for final backlog which represents if work is not handed. The PCA penalty ensures that, if work is being handled, the work is handled within the service time goal. The earliness penalty (Epen) captures the characteristic that some processes have looser service goals than others and hence can be scheduled later (all else being equal) without a reduction in service level. Average queue wait penalty (AQWpen) attempts to maintain schedules where work items in a work queue is handled early whenever possible. The final unused resources penalty (URpen) ensures that the simulation has not unnecessarily overstaffed at any work queue.

In an embodiment, overstaffing may be penalized below all other terms, whereas in previous simulations over and under staffing were given the same priority.

In still further embodiments, the simulation is modified to dynamically generate volume on linked work queues and to handle the process service goal as well. Therefore, the push-forward simulation is modified in order to dynamically generate volume on linked work queues. The simulation is modified to avoid the problem of optimizing to a local optimization, rather than to a global optimization by introducing an earliness penalty and evaluating unsatisfied demand between linked work queues. The simulation is also modified to incorporate process goals not being met with an additional side effect that over staffing is a lowest priority.

Within the modified simulation, agent shift and work activities must be scheduled, across iterations of the simulation in order to arrive at the schedule that optimizes the achievement of the process goals. This scheduling may be performed in embodiments using a simulated annealing search as referenced above. The simulated annealing search can be performed by:

```
T = To
Until T = 0
    s' = s(N(S)) − s(S))
    p(s') = exp(−s'/T) -- the probability that we should except
random move
    If (s' < 0 or R > p(s'))
        Then accept the move --> S = N(S) reduce T
done
```

Figure 8:
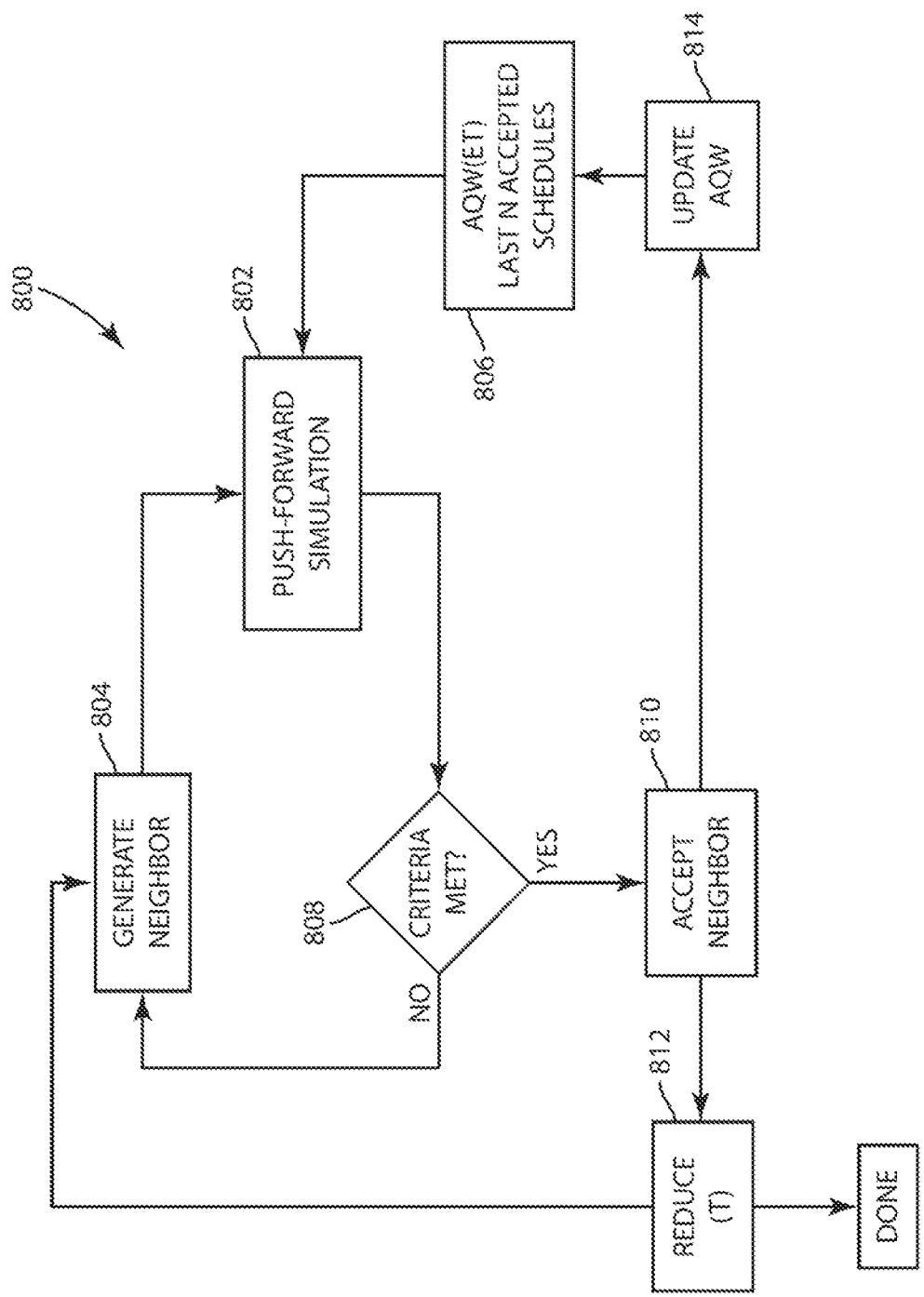
FIG. 8 is a flow char that depicts an exemplary embodiment of a method of simulated annealing.

In the above algorithm, R is a random number between zero and one. T is a temperature. S' is a delta change in service level score after a random move. s(S) is the service level score of schedule S computed by the push-forward simulation as described above. FIG. 8 is a flow chart that depicts an embodiment of a method 800 of the simulated annealing as described above. As can be seen from the flowchart in FIG. 8, an iterative process is performed wherein a push-forward simulation 802 is performed based upon a neighbor generated at 804 and an average queue wait (AQW) calculated at 806. The push-forward simulation 802 results in a service level score. The service level score is compared at 808 to determine if the service level score meets the criteria established to evaluate the service level score for acceptance of the neighbor. If the criteria is not met then a next neighbor is generated at 804. If the criteria is met, then the neighbor is accepted at 810, and the temperature is reduced at 812 and a new neighbor is generated at 804. The average queue wait is updated at 814 such that a new push-forward simulation can be performed at 802 with the newly generated neighbor and updated average queue wait. This process is repeated until the temperature is reduced to zero.

Figure 9:
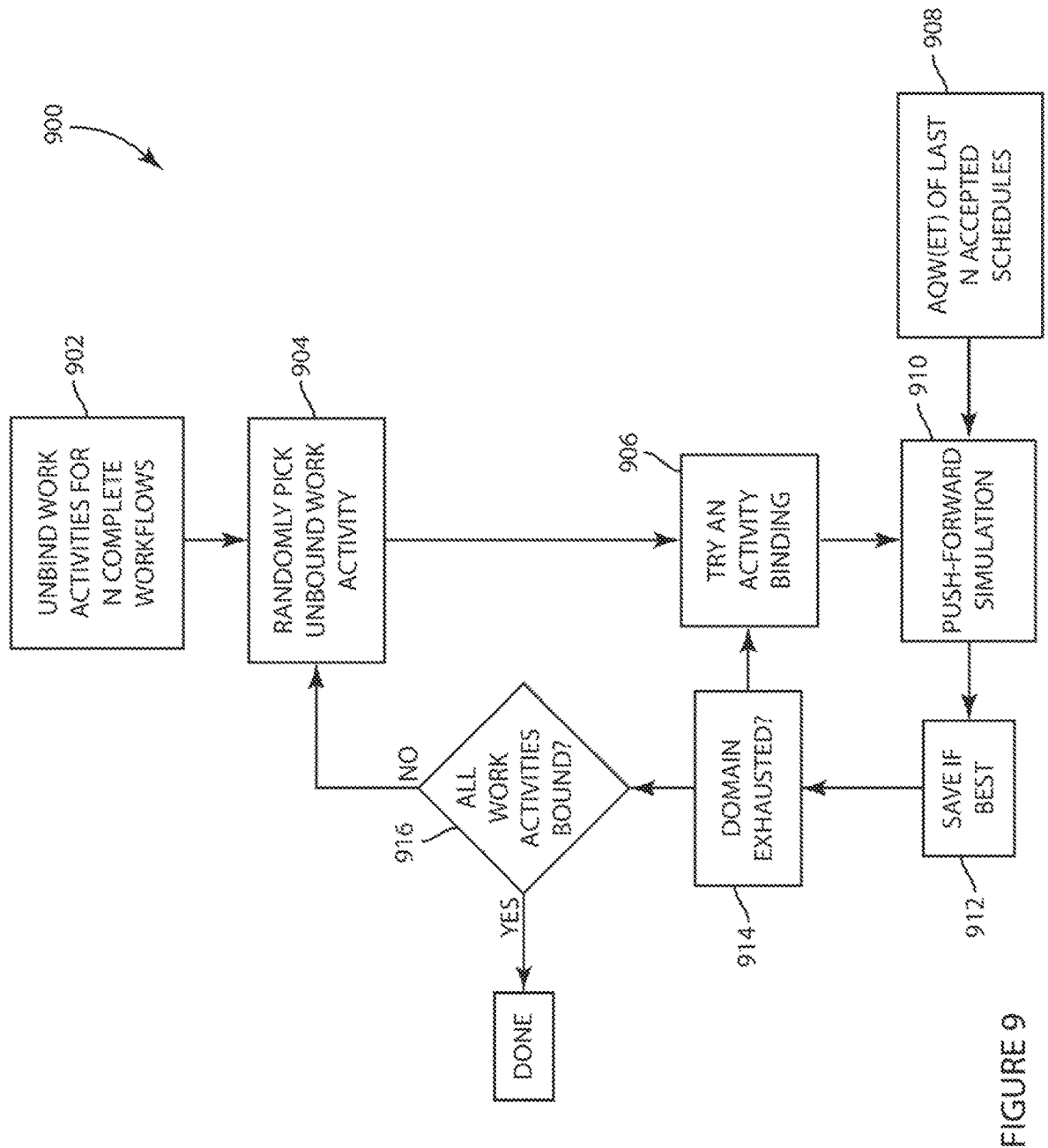
FIG. 9 is a flow chart that depicts an exemplary embodiment of a method of neighbor generation.

FIG. 9 is a flow chart that depicts an embodiment of a method 900 of generating a neighbor. Exemplarily, an embodiment of the method 900 may be used in the method 800 as depicted in FIG. 8 and described above, particularly in implementing an embodiment of 804. The method 900 of generating a neighbor depicted in FIG. 9 relies upon the inherent uncertainty in the EQW which as described above, is a dynamically estimated additional wait factor, which uncertainty is used in the neighbor generation to generate stochastic neighbors. The error in the EQW is representative of how close the process is to a final optimized schedule. Since the uncertainty in the EQW is representative of how close the process is to the last step in the process of an optimized schedule, by unbinding the work activities (backing up through a work process chain), introduces more randomness as there is more inherent uncertainty at each additional work queue must be completed. At 902, work activities for N complete workflows are unbound. In an embodiment, work activities may be unbound until a predetermined number of hours of work have been unbound. Controlling the number of hours of workflow or the number of work processes unbound will control the uncertainty used in the neighbor generation as disclosed in greater detail herein. In an exemplary embodiment workflow can be unbound by:

---

Let S be the current schedule.
    Let H be the hours of work to unbind
        H = f(T)
        Let D be the depth that we backup a process chain
        D = g(T)
            Let G be the granularity
        Until H hours of work unbound
            Select a process interval
            Unbind G units of work at workflow end queues or process p
and then forward propagate the unbound resource through all parent queues in the workflow until depth D is reached or the start of the workflow.

---

Unbound work activity is randomly selected at 904. An activity is scheduled at 906. A push-forward simulation conducted 910 from the attempted activity binding along with an average queue wait determined at 908 from the last N accepted schedules. If the push-forward simulation indicates that the schedule is best or optimized at 912, then the schedule is saved. If the domain of process activity bindings is not exhausted at 914 then a new activity binding is tried at 906. This loop is repeated until all of the activity bindings and domains are exhausted at which point a determination is made at 916 if all of the unbound work activities have been bound. If not, then the process continues back at 904 to randomly pick a remaining unbound work activity. If all of the work activities have been bound at 916, then the process concluded and the stochastic neighbor has been generated, exemplarily as found in step 804, of the method 800 depicted in FIG. 8.

Figure 5:
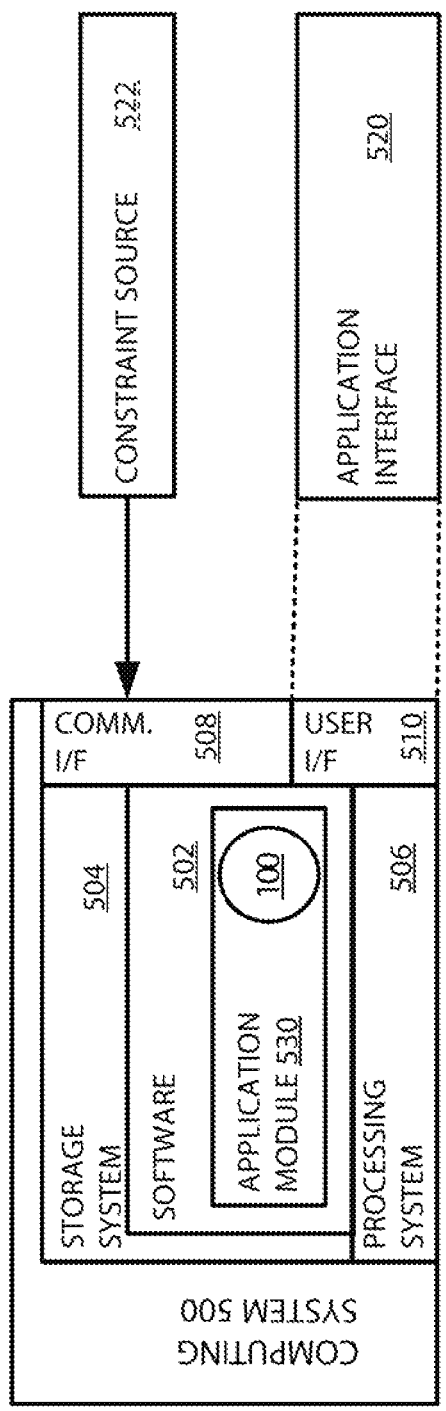
FIG. 5 depicts an exemplary embodiment of a computing system for scheduling work processes.

FIG. 5 illustrates a computing system 500 for scheduling work processes according to one example. Computing system 500 includes processing system 506, storage system 504, software 502, communication interface 508, and user interface 510. Processing system 506 loads and executes software 502 from storage system 504, including software module 530. When executed by computing system 500, software module 530 directs processing system 506 to operate as described herein for method 100.

Although computing system 500 includes one software module in the present example, it should be understood that one or more modules could provide the same operation.

Additionally, computing system 500 includes communication interface 508 that can be configured to receive constraint data from constraint source 522. Constraint source 522 may be any combination of timers, video surveillance cameras, or any device capable of capturing a work queue or work process constraint.

Referring still to FIG. 5, processing system 506 can comprise a microprocessor and other circuitry that retrieves and executes software 502 from storage system 504. Processing system 506 can be implemented within a single processing device but can also be distributed across multiple processing devices or sub-systems that cooperate in executing program instructions. Examples of processing system 506 include general purpose central processing units, application specific processors, and logic devices, as well as any other type of processing device, combinations of processing devices, or variations thereof.

Storage system 504 can comprise any storage media readable by processing system 506, and capable of storing software 502 and constraint data. Storage system 504 can include volatile and nonvolatile, removable and non-removable media implemented in any method or technology for storage of information, such as computer readable instructions, data structures, program modules, or other data. Storage system 504 can be implemented as a single storage device but may also be implemented across multiple storage devices or sub-systems. Storage system 504 can comprise additional elements, such as a controller, capable of communicating with processing system 506.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

User interface 510 can include a mouse, a keyboard, a voice input device, a touch input device for receiving a gesture from a user, a motion input device for detecting non-touch gestures and other motions by a user, and other comparable input devices and associated processing elements capable of receiving user input from a user. These input devices can be used for defining queues, work processes, work process goals, queue constraints, and work process constraints. Output devices such as a video display or graphical display can display the interface further described with respect to FIGS. 3A-3D, speakers, printer, haptic devices, and other types of output devices may also be included in user interface 210.

Application interface 520 can include the interface further described with respect to FIGS. 3A-3D allowing the user to define and edit queues, work processes, work process goals, queue constraints, and work process constraints. Application interface 520 can also display the optimized schedule.

It should be understood that although computing system 500 is shown as one system, the system can comprise one or more systems to execute process 100.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching Inventive principles, some conventional aspects have been simplified or omitted.

Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method of workforce management, utilizing a computing system with a processor and a graphical user interface, the method comprising:
    initializing the graphical user interface having a toolbar, a properties tab, and a canvas;
    defining a plurality of work queues comprising work items in the graphical user interface, said work queues being represented in the toolbar, wherein each of the plurality of work queues graphically represents a specific step in a workflow;
    moving at least two of the plurality of work queues from the toolbar to the canvas;
    creating a directional graphical link connecting at least two of the plurality of work queues on the canvas to form the workflow, wherein the workflow has a work process, wherein the work process has a parent work queue and a child work queue such that the parent work queue and the child work queue are connected by a directional graphical link, wherein each work queue graphically depicts each of the work processes to which it belongs;
    using the graphical user interface to define a work process goal for each work process, said work process goals being represented in the properties tab;
    associating each work process defined in the canvas with at least one of the work process goals from the properties tab;
    generating a schedule, using the processor, for the workflow of a plurality of employee work queue assignments to achieve the work process goals, wherein an employee of a plurality of employees is assigned to each work queue;
    simulating the performance of the generated schedule;
    calculating a performance metric from the simulation, wherein the performance metric is at least one of a first service level score that comprises a product of a total proportion of workflow volume generated at a child work queue by each parent work queue with an unhandled work load penalty for each queue, a second service level score that comprises a single penalty based upon a percentage of work not handled within the at least one work process goal, the single penalty being adjusted to subtract a previous iteratively calculated penalty, or a third service level score that comprises a first penalty based upon when an item of work arrives at a work queue and comprises a second penalty for an iteration of a schedule that leaves unassigned workers;
    comparing the performance metrics to an acceptance criterion;
    wherein if the performance metric meets the acceptance criteria, the schedule of the employee work queue assignments is accepted; and
    wherein if the performance metrics do not meet the acceptance criteria, a new schedule of the employee work queue assignments is generated.

2. The method of claim 1, further comprising:
    calculating an average queue wait time for a plurality of simulated schedules of the employee work queue assignments; and
    using the calculated average queue wait time as a parameter in simulating the performance of the generated schedule.

3. The method of claim 2, wherein generating a schedule of employee work queue assignments further comprises:
- unbinding a plurality of work activities for a predetermined number of work processes;
- randomly selecting an unbound work activity and iteratively assigning an employee to the work activity and simulating the performance of the work activity to optimize the employee assignment to the work activity until employees are assigned to each of the plurality of unbound work activities.

4. The method of claim 2, further comprising updating the acceptance criteria to reflect the performance metrics of the accepted schedule of employee work queue assignments and generating a new schedule of employee work queue assignments.

5. The method of claim 1, wherein the performance metric is the first service level score.

6. The method of claim 1, wherein simulating the performance of the generated schedule further comprises:
- moving forward each work queue in the workflow in parallel on an interval by interval basis; and
- updating a work load at each work queue in the workflow upon the completion of each interval.

7. The method of claim 1, wherein the performance metric is the second service level score.

8. The method of claim 1, wherein the performance metric is the third service level score.

9. The method of claim 1, wherein simulating the performance of the generated schedule further comprises:
- receiving historical workflow data;
- identifying at least one parent work queue and at least one child work queue from the historical data for which to determine at least one distribution proportion;
- minimizing a minimization equation with a linear constraint solver and the historical data; and
- determining a distribution proportion of the minimized minimization equation.

* * * * *